US010170810B2

(12) United States Patent
Dudley et al.

(10) Patent No.: US 10,170,810 B2
(45) Date of Patent: Jan. 1, 2019

(54) THERMALLY CONDUCTIVE BASE MEMBER AND METHOD OF ASSEMBLING THE THERMALLY CONDUCTIVE BASE MEMBER

(71) Applicant: LG Chem, Ltd., Seoul (KR)

(72) Inventors: Scott Dudley, Commerce Township, MI (US); Robert Merriman, Shelby Township, MI (US); Heekook Yang, Troy, MI (US)

(73) Assignee: LG Chem, Ltd., Seoul (KR)

( * ) Notice: Subject to any disclaimer, the term of this patent is extended or adjusted under 35 U.S.C. 154(b) by 234 days.

(21) Appl. No.: 15/149,288

(22) Filed: May 9, 2016

(65) Prior Publication Data

US 2017/0324129 A1  Nov. 9, 2017

Related U.S. Application Data

(60) Provisional application No. 62/324,003, filed on Apr. 18, 2016.

(51) Int. Cl.
*H01M 10/6556* (2014.01)
*H01M 10/613* (2014.01)
(Continued)

(52) U.S. Cl.
CPC ......... *H01M 10/6556* (2015.04); *B23K 9/007* (2013.01); *H01M 2/1016* (2013.01); *H01M 10/613* (2015.04)

(58) Field of Classification Search
None
See application file for complete search history.

(56) References Cited

U.S. PATENT DOCUMENTS 6,783,630 B2  8/2004  Shajii et al.
7,166,187 B2  1/2007  Shajii et al.
(Continued)

FOREIGN PATENT DOCUMENTS

EP  2337141 A1  6/2011
EP  2337141 B1  6/2011
(Continued)

OTHER PUBLICATIONS

International Search Report on PCT/KR2017003711 dated Apr. 5, 2017.
(Continued)

*Primary Examiner* — Daniel S Gatewood
(74) *Attorney, Agent, or Firm* — Buckert Patent & Trademark Law Firm PC; John F. Buckert

(57) ABSTRACT

A thermally conductive base member and a method of assembly are provided. The thermally conductive base member includes first and second metal base members, and a top plate. The first metal base member has a first bottom plate, first and second female coupling portions, and first and second rib portions. The second metal base member has a second bottom plate, a first male coupling portion, and first and second rib portions. The first male coupling portion is disposed in and coupled to the first female coupling portion. The top plate is coupled to a top surface of the first female coupling portion, a top surface of the second female coupling portion, and the first and second rib portions of the first metal base member such that a first flow channel is defined between the first and second rib portions of the first metal base member and the top plate.

9 Claims, 11 Drawing Sheets

(51) Int. Cl.
*H01M 10/653* (2014.01)
*H01M 10/0525* (2010.01)
*H01M 2/10* (2006.01)
*B23K 9/007* (2006.01)

(56) References Cited

U.S. PATENT DOCUMENTS

| | | |
|---|---|---|
| 9,537,127 B2 | 1/2017 | Schreiber et al. |
| 2012/0315529 A1* | 12/2012 | Jin .................... H01M 10/5004 429/120 |
| 2013/0192507 A1 | 8/2013 | Chu et al. |
| 2014/0234688 A1* | 8/2014 | Cha .................... H01M 10/625 429/120 |

FOREIGN PATENT DOCUMENTS

| | | | | |
|---|---|---|---|---|
| EP | 2337141 B1 * | 6/2017 | ............ | B60L 3/0046 |
| JP | 2009252646 A | 10/2009 | | |
| JP | 2013134993 A | 7/2013 | | |
| KR | 20120137792 A | 12/2012 | | |
| KR | 20140007029 A | 1/2014 | | |

OTHER PUBLICATIONS

European Search Report for European Patent Application No. 17786102.8 dated Apr. 18, 2018.

* cited by examiner

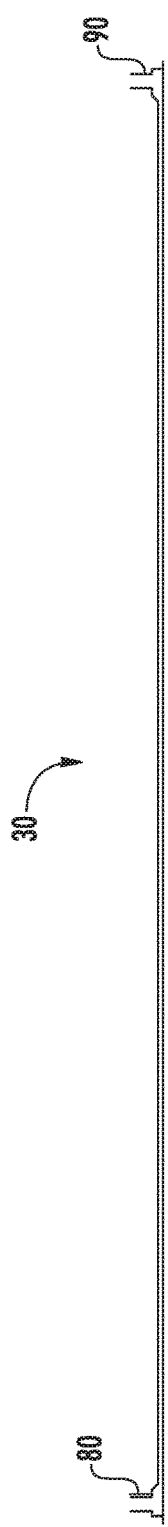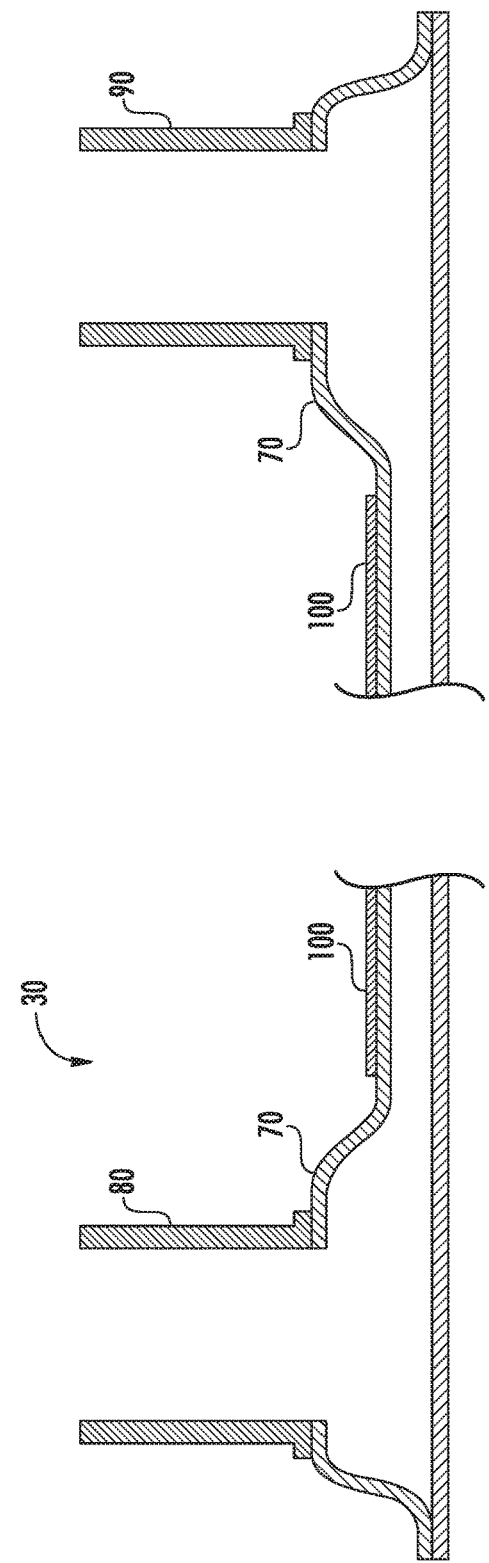

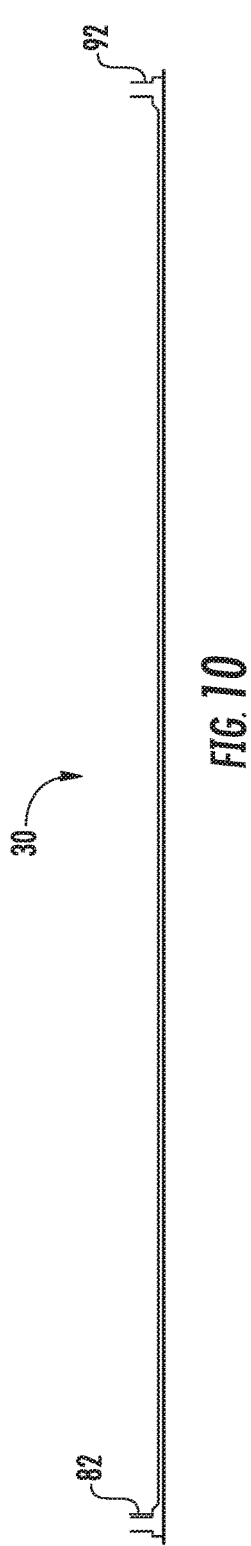
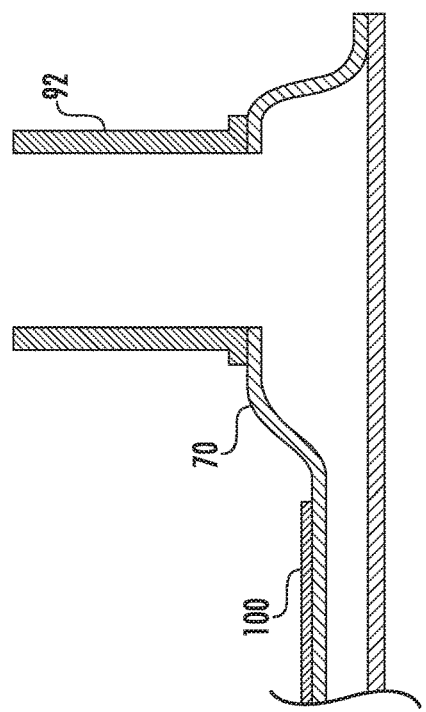
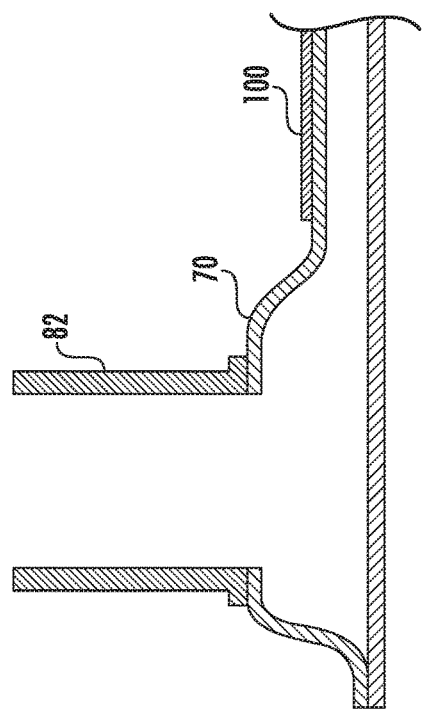

THERMALLY CONDUCTIVE BASE MEMBER AND METHOD OF ASSEMBLING THE THERMALLY CONDUCTIVE BASE MEMBER

CROSS-REFERENCE TO RELATED APPLICATION

This application claims priority to U.S. Provisional Patent Application No. 62/324,003 filed on Apr. 18, 2016, the entire contents of which are hereby incorporated by reference herein.

BACKGROUND

The inventors herein have recognized a need for an improved thermally conductive base member having female coupling features and male coupling features that allow a size of the thermally conductive base member to be adjustable depending on a desired size thereof to hold one or more battery packs thereon.

SUMMARY

A thermally conductive base member in accordance with an exemplary embodiment is provided. The thermally conductive base member includes a first metal base member having a first bottom plate, first and second female coupling portions, and first and second rib portions. The first female coupling portion is coupled to a first end of the first bottom plate. The second female coupling portion is coupled to a second end of the first bottom plate. The first and second rib portions of the first metal base member are coupled to and extend from a top surface of the first bottom plate and are spaced apart from one another. The first and second rib portions of the first metal base member are disposed between the first and second female coupling portions. The thermally conductive base member further includes a second metal base member having a second bottom plate, a first male coupling portion, and first and second rib portions. The first male coupling portion is coupled to the second bottom plate proximate to a first end of the second bottom plate. The first and second rib portions of the second metal base member are coupled to and extending from a top surface of the second bottom plate and are spaced apart from one another. The first male coupling portion of the second metal base member is disposed in and coupled to the first female coupling portion of the first metal base member. The thermally conductive base member further includes a top plate that is disposed on and coupled to a top surface of the first female coupling portion, a top surface of the second female coupling portion, and the first and second rib portions of the first metal base member such that a first flow channel is defined between the first and second rib portions of the first metal base member and the top plate. The top plate is further disposed on and coupled to the first and second rib portions of the second metal base member such that a second flow channel is defined between the first and second rib portions of the second metal base member and the top plate. The thermally conductive base member further includes a first inlet port member that is coupled to a top surface of the top plate that fluidly communicates with the first and second flow channels. The thermally conductive base member further includes a first outlet port member that is coupled to the top surface of the top plate that fluidly communicates with the first and second flow channels.

A method for assembling a thermally conductive base member in accordance with another exemplary embodiment is provided. The method includes providing a first metal base member having a first bottom plate, first and second female coupling portions, and first and second rib portions. The first female coupling portion is coupled to a first end of the first bottom plate. The second female coupling portion is coupled to a second end of the first bottom plate. The first and second rib portions of the first metal base member are coupled to and extend from a top surface of the first bottom plate and are spaced apart from one another. The first and second rib portions of the first metal base member are disposed between the first and second female coupling portions. The method further includes providing a second metal base member having a second bottom plate, a first male coupling portion, and first and second rib portions. The first male coupling portion is coupled to the second bottom plate proximate to a first end of the second bottom plate. The first and second rib portions of the second metal base member are coupled to and extend from a top surface of the second bottom plate and are spaced apart from one another. The method further includes coupling the first male coupling portion of the second metal base member to the first female coupling portion of the first metal base member. The method further includes welding a top plate to a top surface of the first female coupling portion, a top surface of the second female coupling portion, and the first and second rib portions of the first metal base member, and the first and second rib portions of the second metal base member, such that a first flow channel is defined between the first and second rib portions of the first metal base member and the top plate, and a second flow channel is defined between the first and second rib portions of the second metal base member and the top plate. The method further includes coupling a first inlet port member to a top surface of the top plate that fluidly communicates with the first and second flow channels. The method further includes coupling a first outlet port member to the top surface of the top plate that fluidly communicates with the first and second flow channels.

BRIEF DESCRIPTION OF THE DRAWINGS

FIG. 7 is a cross-sectional schematic of the thermally conductive base member of FIG. 2 taken along lines 7-7 in FIG. 2;

FIG. 8 is an enlarged cross-sectional schematic of a portion of the thermally conductive base member shown in FIG. 7;

FIG. 9 is an enlarged cross-sectional schematic of another portion of the thermally conductive base member shown in FIG. 7;

FIG. 10 is a cross-sectional schematic of the thermally conductive base member of FIG. 2 taken along lines 10-10 in FIG. 2;

FIG. 11 is an enlarged cross-sectional schematic of a portion of the thermally conductive base member shown in FIG. 10;

FIG. 12 is an enlarged cross-sectional schematic of another portion of the thermally conductive base member shown in FIG. 10;

DETAILED DESCRIPTION

Figure 1:
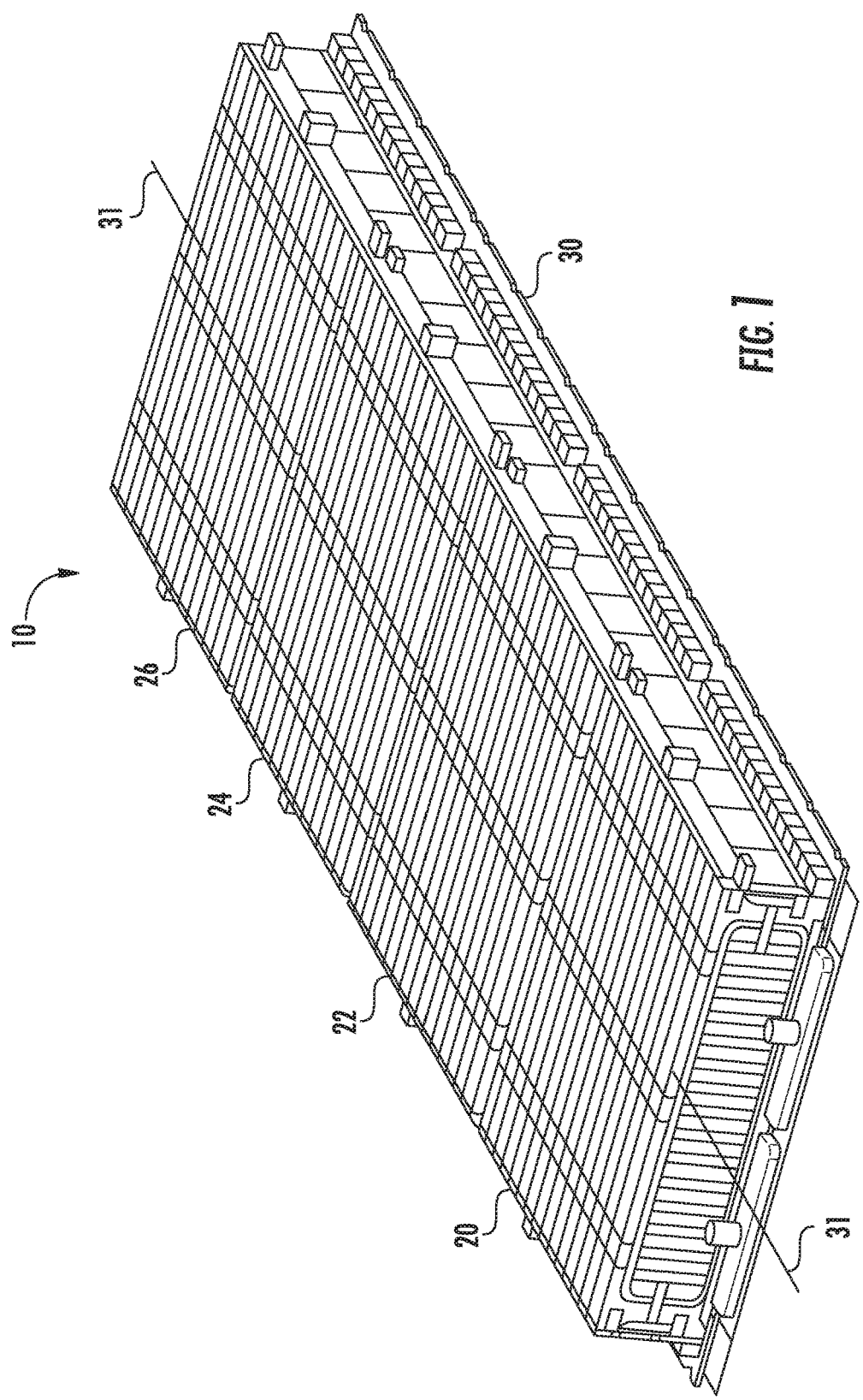
FIG. 1 is a schematic of a battery system in accordance with an exemplary embodiment.
Figure 2:
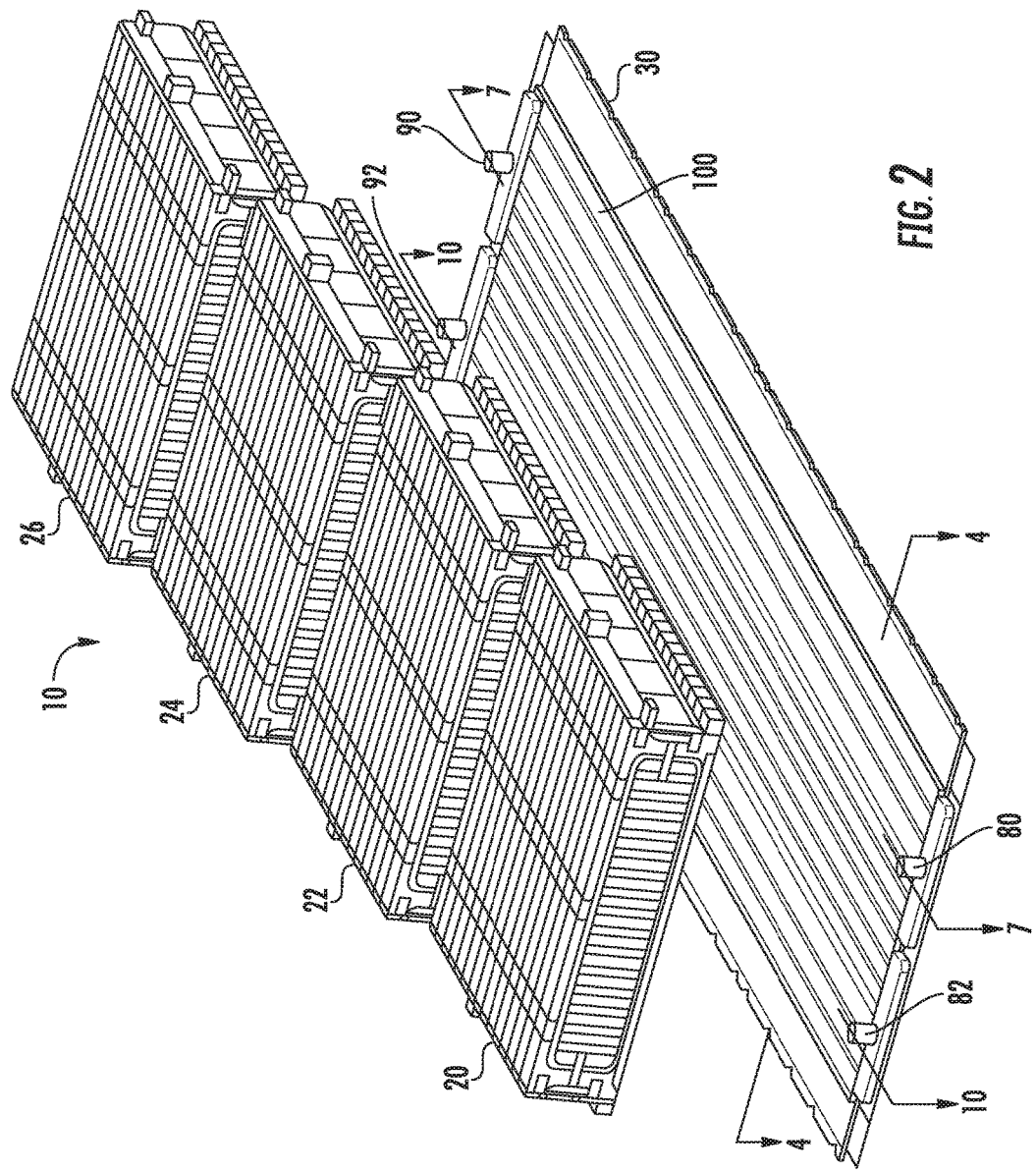
FIG. 2 is an exploded schematic of the battery system of FIG. 1. having first, second, third, and fourth battery packs and a thermally conductive base member.
Figure 3:
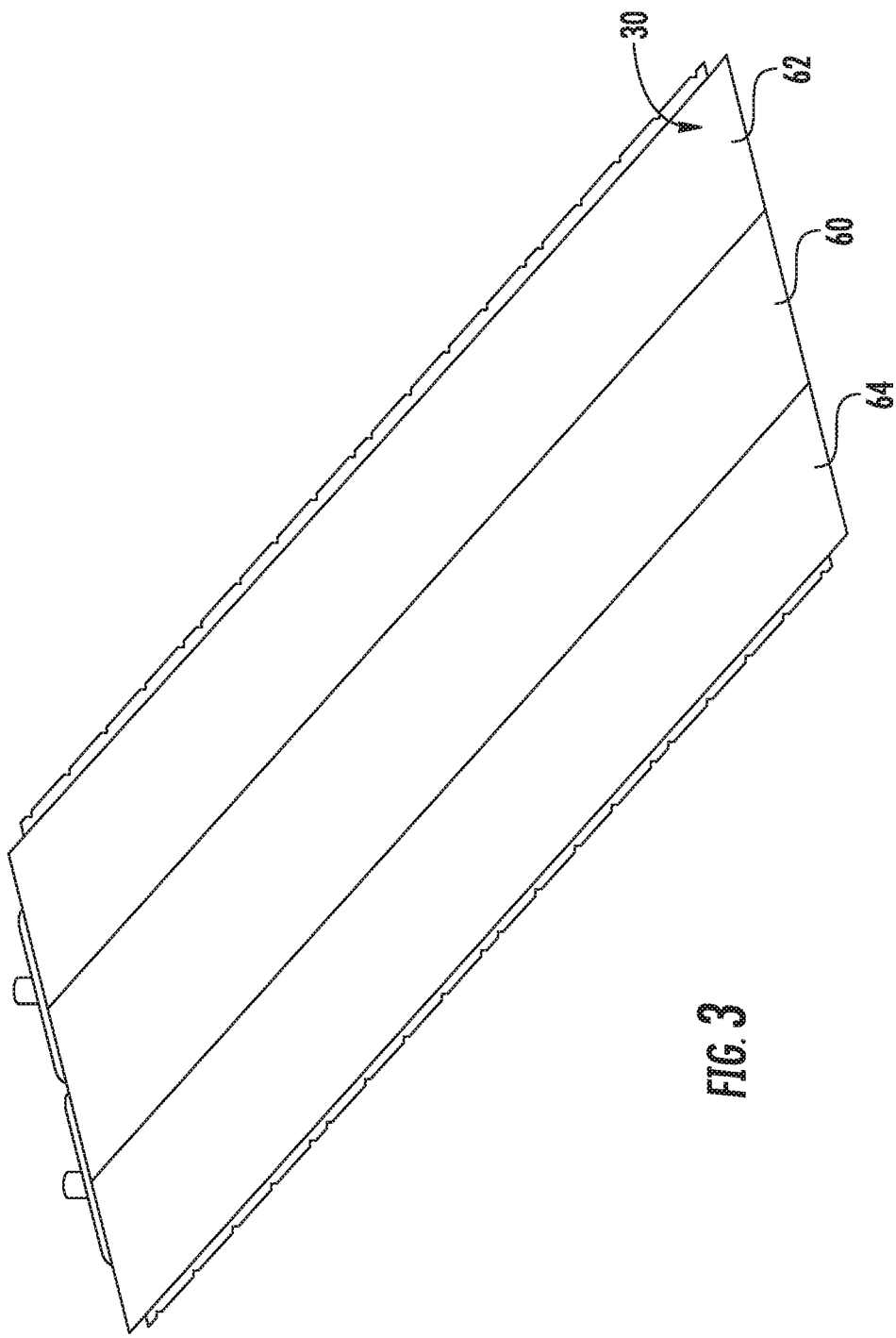
FIG. 3 is a schematic of a bottom portion of the thermally conductive base member of FIG. 2.

Referring to FIGS. 1 and 2, a battery system 10 is provided. The battery system 10 includes battery packs 20, 22, 24, 26, and a thermally conductive base member 30 in accordance with an exemplary embodiment. The battery system 10 extends along a longitudinal axis 31. An advantage of the thermally conductive base member 30 is that the base member 30 utilizes a metal base member 60 (shown in FIG. 4) having female coupling portions thereon that are utilized to couple the metal base member 60 to metal base members 62, 64 to increase a size of the thermally conductive base member 30 for holding the battery packs 20-26 thereon.

The battery packs 20-26 are disposed directly on the thermally conductive base member 30. In an exemplary embodiment, each of the battery packs 20-26 have lithium-ion pouch-type battery cells disposed therein.

Referring to FIGS. 2-6, the thermally conductive base member 30 is provided to conduct heat energy from the battery packs 20-26 to a fluid flowing through the thermally conductive base member 30. The thermally conductive base member 30 includes metal base members 60, 62, 64, a top plate 70, inlet port members, 80, 82, outlet port members, 90, 92, and a thermally conductive pad 100.

The metal base member 60 has a bottom plate 120, female coupling portions 130, 132, and rib portions 134, 136, 138, 140, 142. The bottom plate 120 has a bottom surface 160 (shown in FIG. 6) and a top surface 162. In an exemplary embodiment, the metal base member 60 is constructed of aluminum.

The female coupling portion 130 is coupled to a first end of the bottom plate 120. The female coupling portion 130 is a substantially C-shaped portion. The female coupling portion 130 has a top surface 180 (shown in FIG. 5), a bottom surface 182, an end surface 183, and a groove 184 extending into the end surface 183.

The female coupling portion 132 is coupled to a second end of the bottom plate 120. The female coupling portion 132 is a substantially C-shaped portion. The female coupling portion 132 has a top surface 200 (shown in FIG. 6), a bottom surface 202, an end surface 203, and a groove 204 extending into the end surface 203.

Figure 4:
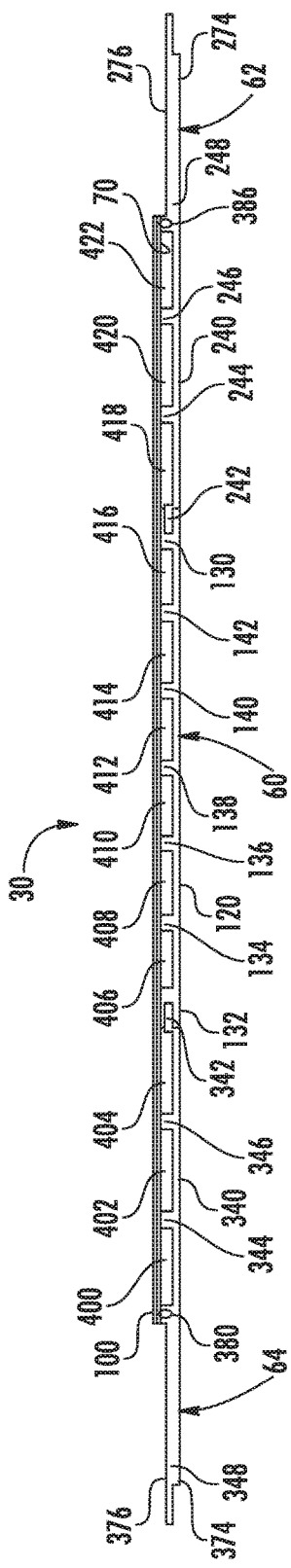
FIG. 4 is a cross-sectional schematic of the thermally conductive base member of FIG. 2 taken along lines 4-4 in FIG. 2.
Figure 5:
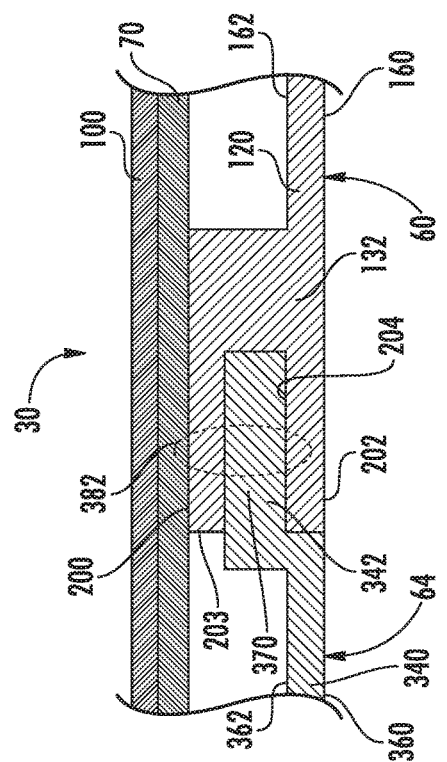
FIG. 5 is an enlarged cross-sectional schematic of a portion of the thermally conductive base member shown in FIG. 4.

Referring to FIGS. 4 and 5, the metal base member 62 has a bottom plate 240, a male coupling portion 242, rib portions 244, 246, and an outer ledge portion 248. In an exemplary embodiment, the metal base member 62 is constructed of aluminum.

The bottom plate 240 has a bottom surface 260 (shown in FIG. 5) and a top surface 262.

The male coupling portion 242 is coupled to the bottom plate 240 proximate to a first end of the bottom plate 240. The male coupling portion 242 includes an extension portion 270. The male coupling portion 242 is disposed in the groove 184 of the female coupling portion 130 of the metal base member 60 and is coupled to the female coupling portion 130.

The rib portions 244, 246 are coupled to and extend from a top surface 262 (shown in FIG. 5) of the bottom plate 240 and are spaced apart from one another. The rib portions 244, 246 are disposed between the male coupling portion 242 and the outer ledge portion 248. The rib portions 244, 246 extend longitudinally along the bottom plate 240 and substantially parallel to one another. Further, the rib portions 244, 246 extend substantially perpendicular to the top surface 262 of the bottom plate 240.

The outer ledge portion 248 is coupled to a second end of the bottom plate 240. The outer ledge portion 248 includes a bottom surface 274 (shown in FIG. 4) and a top surface 276.

Figure 6:
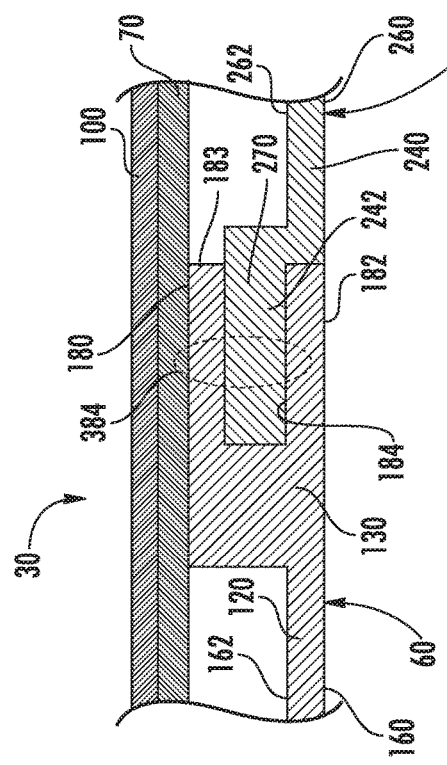
FIG. 6 is an enlarged cross-sectional schematic of another portion of the thermally conductive base member shown in FIG. 4.
Figure 13:
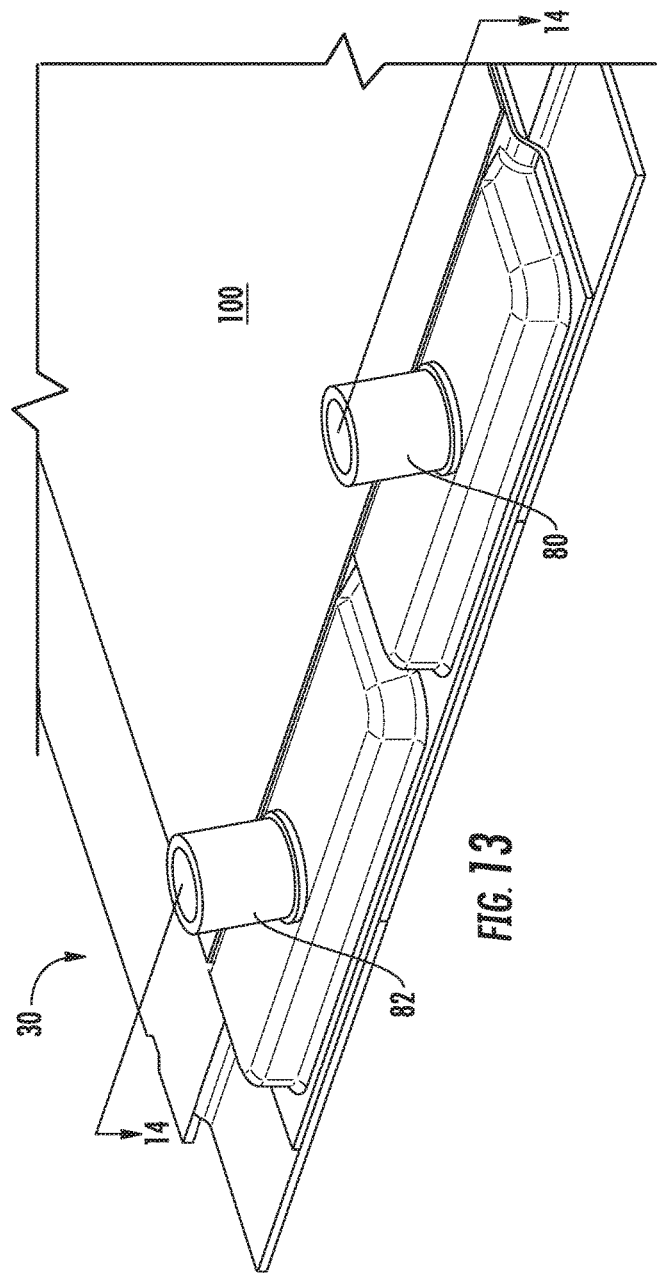
FIG. 13 is an enlarged schematic of a first end of the thermally conductive base member of FIG. 2.
Figure 14:
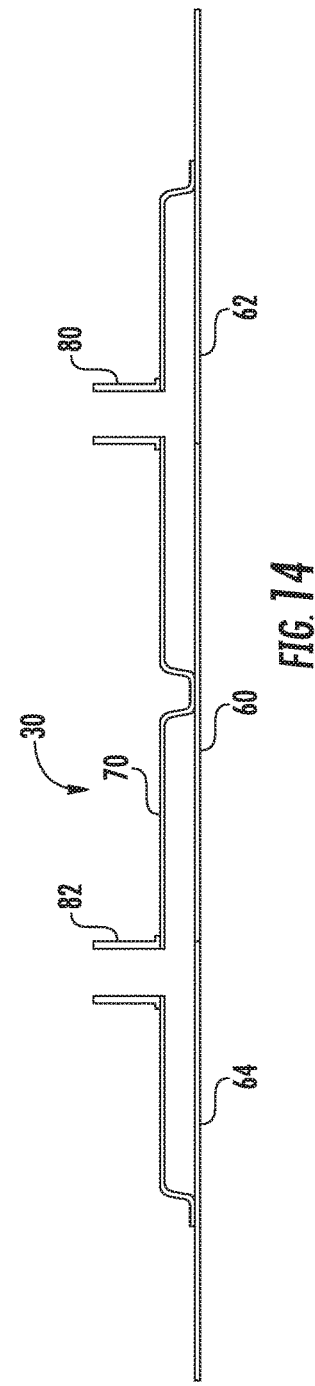
FIG. 14 is a cross-sectional schematic of the thermally conductive base member of FIG. 13 taken along lines 14-14 in FIG. 13.
Figure 15:
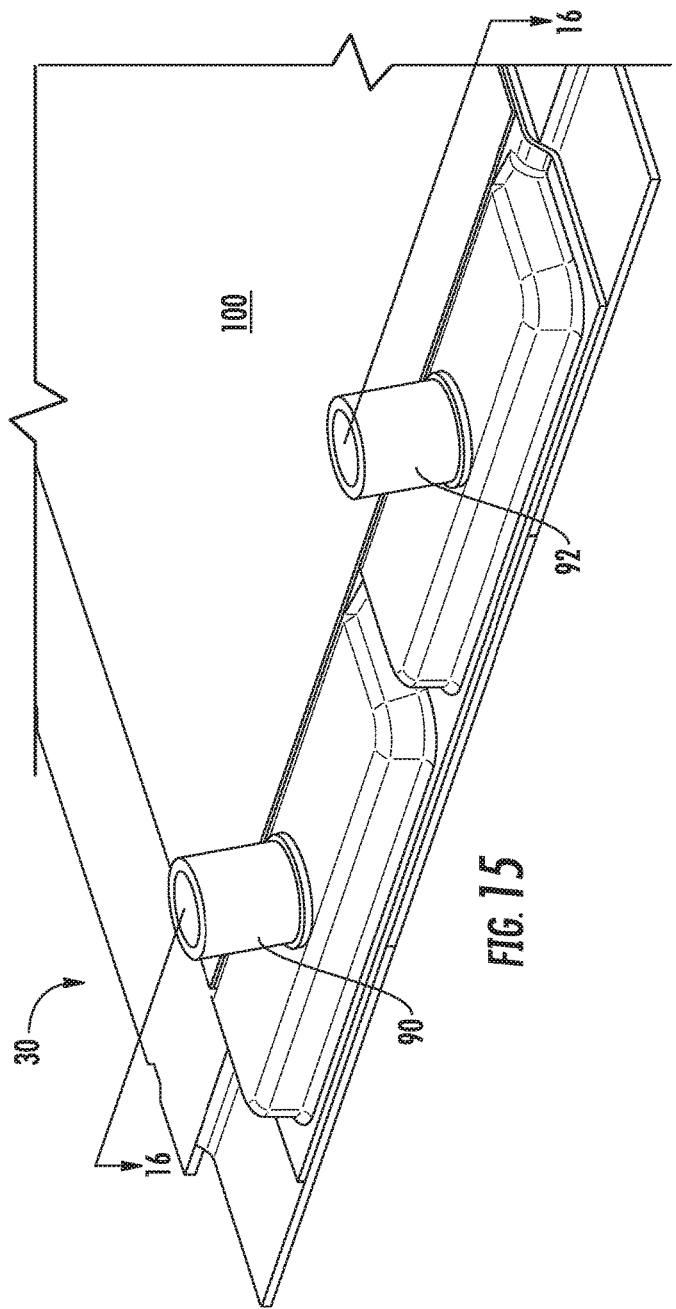
FIG. 15 is an enlarged schematic of a second end of the thermally conductive base member of FIG. 2.
Figure 16:
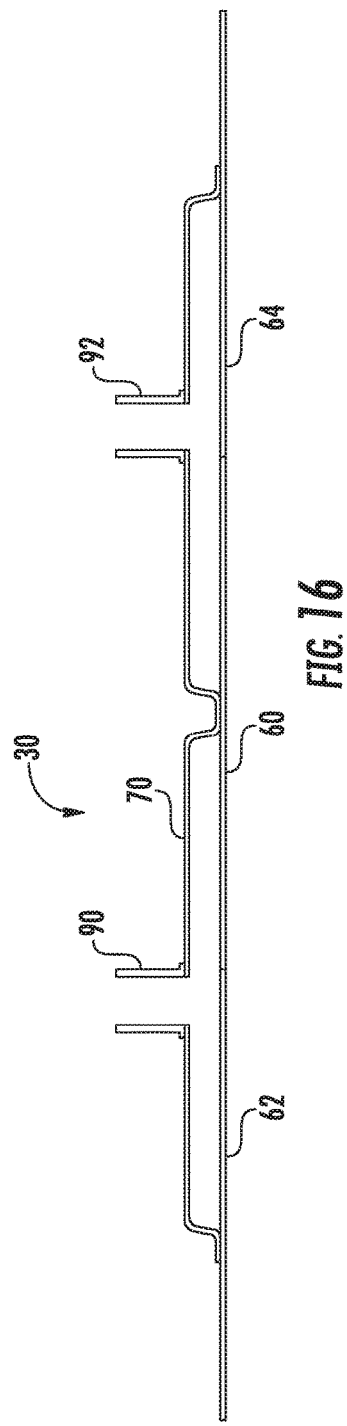
FIG. 16 is a cross-sectional schematic of the thermally conductive base member of FIG. 15 taken along lines 16-16 in FIG. 15.
Figure 17:
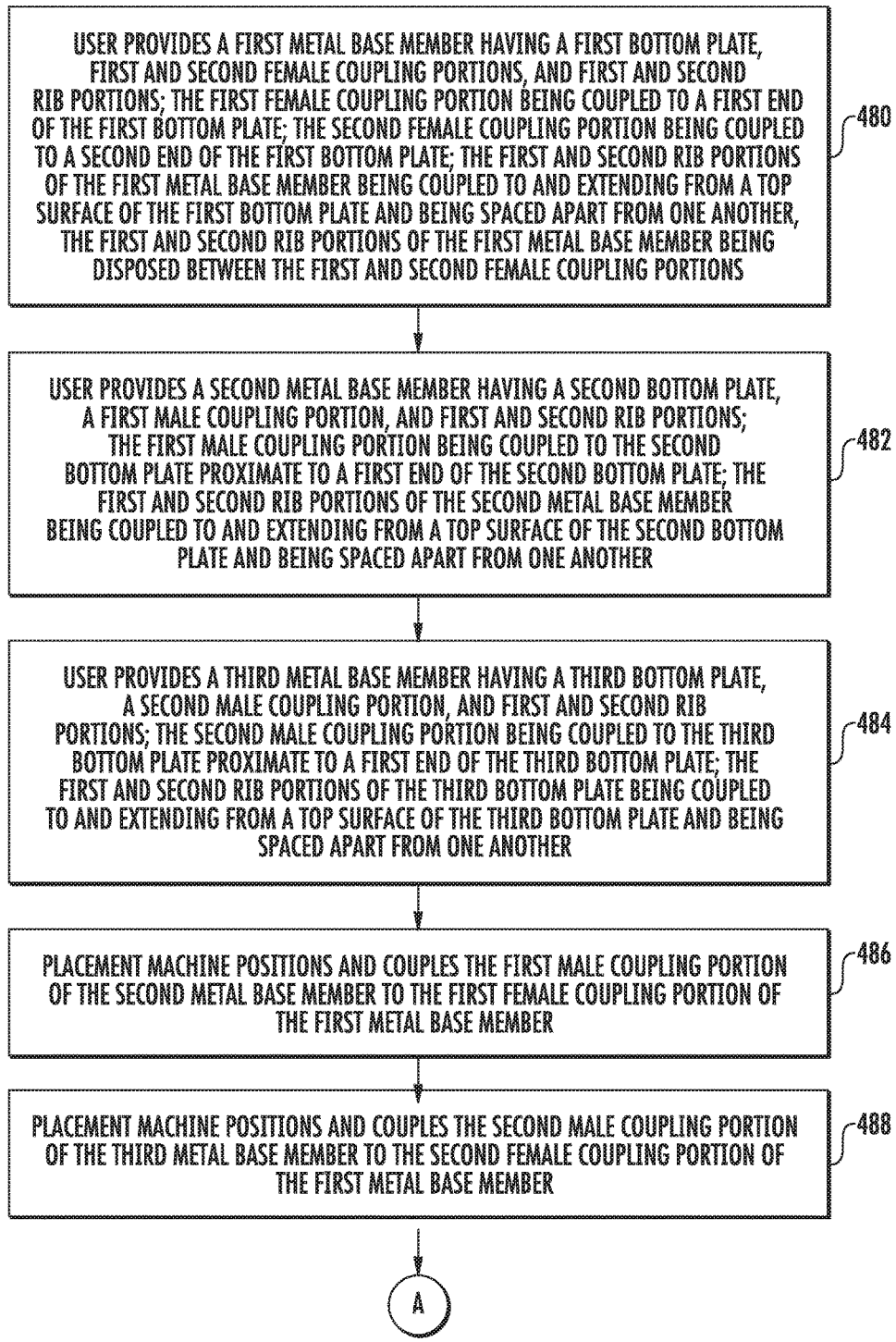
FIGS. 17 and 18 are flowcharts of a method for assembling the thermally conductive base member of FIG. 2.
Figure 18:
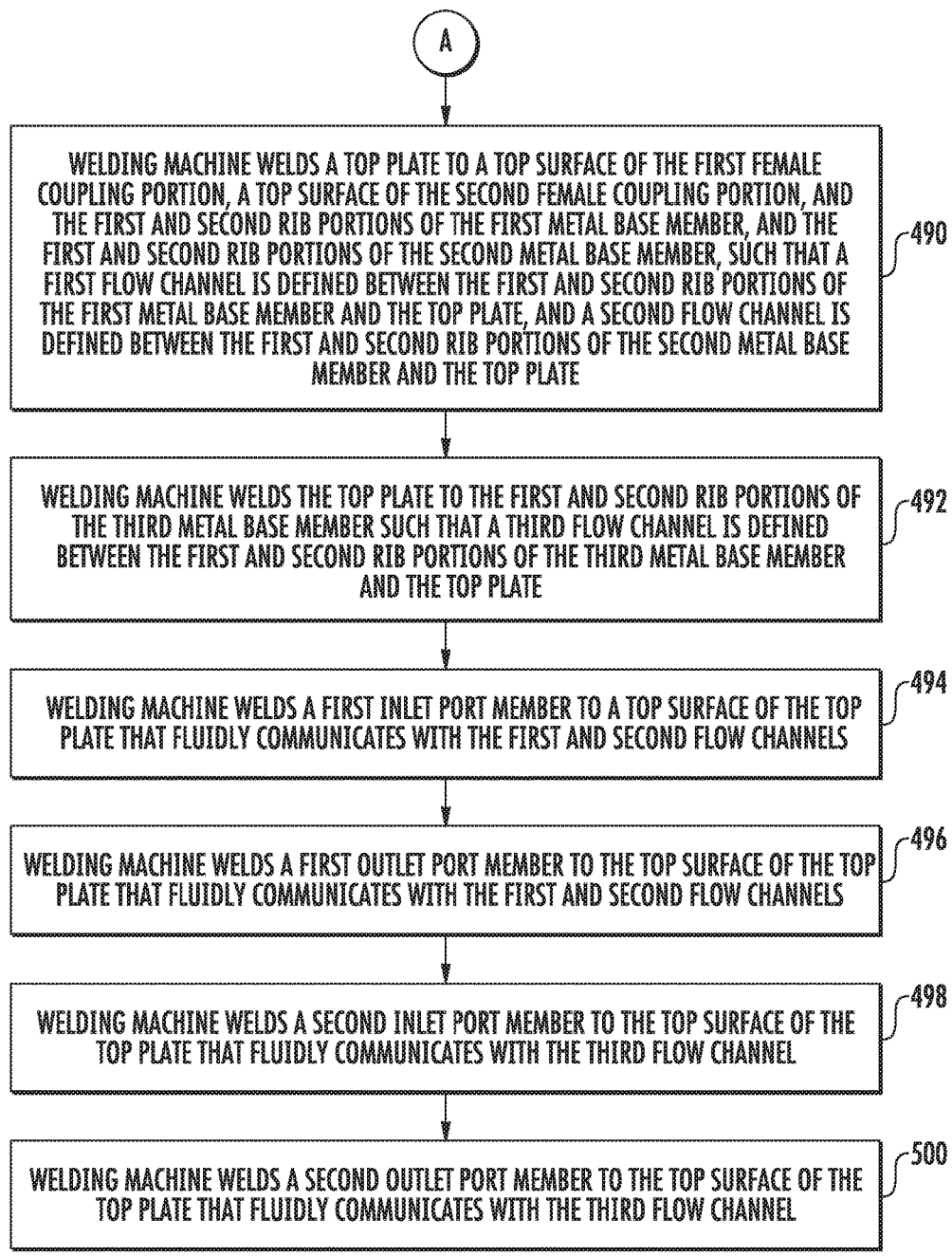
Figure 19:
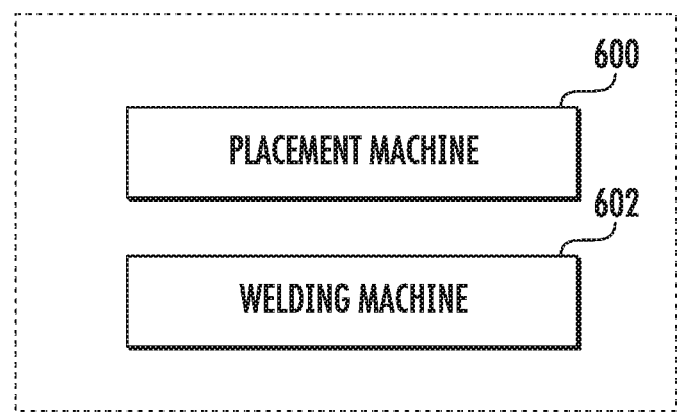
FIG. 19 is a schematic of a placement machine and a welding machine utilized for assembling the thermally conductive base member of FIG. 2.

Referring to FIGS. 4 and 6, the metal base member 64 has a bottom plate 340, a male coupling portions 342, rib portions 344, 346, and an outer ledge portion 348. In an exemplary embodiment, the metal base member 64 is constructed of aluminum.

The bottom plate 340 has a bottom surface 360 (shown in FIG. 6) and a top surface 362.

The male coupling portion 342 is coupled to the bottom plate 340 proximate to a first end of the bottom plate 340. The male coupling portion 342 includes an extension portion 370. The male coupling portion 342 is disposed in the groove 204 of the female coupling portion 132 of the metal base member 60 and is coupled to the female coupling portion 132.

The rib portions 344, 346 are coupled to and extend from the top surface 362 of the bottom plate 340 and are spaced apart from one another. The rib portions 344, 346 are disposed between the male coupling portion 342 and the outer ledge portion 348. The rib portions 344, 346 extend longitudinally along the bottom plate 340 and substantially parallel to one another. Further, the rib portions 344, 346 extend substantially perpendicular to the top surface 362 (shown in FIG. 6) of the bottom plate 340.

The outer ledge portion 348 is coupled to a second end of the bottom plate 340. The outer ledge portion 348 includes a bottom surface 374 (shown in FIG. 4) and a top surface 376.

Referring to FIGS. 4-6, the top plate 70 is disposed on and coupled to the top surface 180 of the female coupling portion 130, top surfaces of the rib portions 134, 136, 138, 140, 142, and the top surface 200 of the female coupling portion 132 of the metal base member 60. In particular, the top plate 70 is welded to the female coupling portion 130, the rib portions 134, 136, 138, 140, 142, and the female coupling portion 132 of the metal base member 60. For example, a weld joint 382 extends through the top plate 70, and the female coupling portion 132, and the male coupling portion 342. Further, a weld joint 384 extends through the top plate 70, and the female coupling portion 130, and the male coupling portion 242.

The top plate 70 is further disposed on and coupled to the top surfaces of the rib portions 244, 246, and the top surface 276 of the outer ledge portion 248 of the metal base member 62. In particular, the top plate 70 is welded to the rib portions 244, 246, and the outer ledge portion 248 of the metal base member 62. For example, a weld joint 386 extends through the top plate 70 and the outer ledge portion 248.

The top plate 70 is further disposed on and coupled to the top surface 376 of the outer ledge portion 348, top surfaces of the rib portions 344, 346 of the metal base member 64. In particular, the top plate 70 is welded to the outer ledge portion 348 and the rib portions 344, 346 of the metal base member 64. For example, a weld joint 380 extends through the top plate 70 and the outer ledge portion 348.

Referring to FIG. 4, the thermally conductive base member 20 defines several flow channels therethrough for receiving a cooling fluid therethrough. A flow channel 400 is defined between the outer ledge portion 348, the rib portion 344, and the top plate 70. Also, a flow channel 402 is defined between the rib portions 344, 346 and the top plate 70. Further, a flow channel 404 is defined between the rib portion 346, and the coupled portion of the male coupling portion 342 and the female coupling portion 132, and the top plate 70. A flow channel 406 is defined between the female coupling portion 132, and the rib portion 134, and the top plate 70. Also, a flow channel 408 is defined between the rib portions 134, 136 and the top plate 70. Further, a flow channel 410 is defined between the rib portions 136, 138 and the top plate 70. A flow channel 412 is defined between the rib portions 138, 140 and the top plate 70. Also, a flow channel 414 is defined between the rib portions 140, 142 and the top plate 70. Further, a flow channel 416 is defined between the rib portion 142, and the female coupling portion 130, and the top plate 70. A flow channel 418 is defined between the coupled portion of the male coupling portion 242 and the female coupling portion 130, and the rib portion 244, and the top plate 70. Also, a flow channel 420 is defined between the rib portions 244, 246, and the top plate 70. Further, a flow channel 422 is defined between the rib portion 246, the outer ledge portion 248, and the top plate 70.

Referring to FIGS. 2, 4, 8 and 11, the inlet port members 80, 82 are coupled to a top surface of the top plate 70. The inlet port member 80 fluidly communicates with flow channels 412, 414, 416, 418, 420, 422. The inlet port member 82 fluidly communicates with the flow channels 400, 402, 404, 406, 408, 410. A fluid supply system (not shown) supplies a fluid through the inlet port members 80, 82 which flows through the flow channels of the thermally conductive base member 30. In an exemplary embodiment, the inlet port members 80, 82 are constructed of aluminum and are welded to the top plate 70.

Referring to FIGS. 2, 4, 9, 12, the outlet port members 90, 92 are coupled to a top surface of the top plate 70. The outlet port member 90 fluidly communicates with flow channels 412, 414, 416, 418, 420, 422. The outlet port member 92 fluidly communicates with the flow channels 400, 402, 404, 406, 408, 410. The fluid supply system (not shown) receives a fluid from the outlet port members 90, 92. In an exemplary embodiment, the outlet port members 90, 92 are constructed of aluminum and are welded to the top plate 70.

The thermally conductive pad 100 is disposed on and coupled to a top surface of the top plate 70.

Referring to FIGS. 2, 4 and 17-19, a flowchart of a method for assembling the thermally conductive base member 30 in accordance with another exemplary embodiment will now be described. For purposes of simplicity, only a portion of the flow channels will be discussed in the following method.

At step 480, a user provides the metal base member 60 having the bottom plate 120, female coupling portions 130, 132, and rib portions 138, 140. The female coupling portion 130 is coupled to a first end of the bottom plate 120. The female coupling portion 132 is coupled to a second end of the bottom plate 120. The rib portions 138, 140 of the metal base member 60 are coupled to and extend from the top surface 162 of the bottom plate 120 and are spaced apart from one another. The rib portions 138, 140 of the metal base member 60 are disposed between the female coupling portions 130, 132.

At step 482, the user provides the metal base member 62 having the bottom plate 240, the male coupling portion 242, and rib portions 244, 246. The male coupling portion 242 is coupled to the bottom plate 240 proximate to a first end of the bottom plate 240. The rib portions 244, 246 of the second metal base member 62 are coupled to and extend from the top surface 262 of the bottom plate 240 and are spaced apart from one another.

At step 484, the user provides the metal base member 64 having the bottom plate 340, the male coupling portion 342, and rib portions 344, 346. The male coupling portion 342 is coupled to the bottom plate 340 proximate to a first end of the bottom plate 340. The rib portions 344, 346 of the bottom plate 340 are coupled to and extend from the top surface 362 of the bottom plate 340 and are spaced apart from one another.

At step 486, the placement machine 600 (shown in FIG. 19) positions and couples the male coupling portion 242 of the metal base member 62 to the female coupling portion 130 of the metal base member 60.

At step 488, the placement machine 600 positions and couples the male coupling portion 342 of the metal base member 64 to the female coupling portion 132 of the metal base member 60.

At step 490, the welding machine 602 welds the top plate 70 to the top surface 180 of the female coupling portion 130, the top surface 200 of the female coupling portion 132, and the rib portions 138, 140 of the metal base member 60, and the rib portions 244, 246 of the metal base member 62, such that the flow channel 412 is defined between the rib portions 138, 140 of the metal base member 60 and the top plate 70, and the flow channel 420 is defined between the rib portions 244, 246 of the metal base member 62 and the top plate 70.

At step 492, the welding machine 602 welds the top plate 70 to the rib portions 344, 346 of the metal base member 64 such that the flow channel 402 is defined between the rib portions 344, 346 of the metal base member 64 and the top plate 70.

At step 494, the welding machine 602 welds the inlet port member 80 (shown in FIG. 2) to a top surface of the top plate 70 that fluidly communicates with the flow channels 412, 420.

At step 496, the welding machine 602 welds the outlet port member 90 to the top surface of the top plate 70 that fluidly communicates with the flow channels 412, 420

At step 498, the welding machine 602 welds the inlet port member 82 to the top surface of the top plate 70 that fluidly communicates with the flow channel 402.

At step 500, the welding machine 602 welds the outlet port member 92 to the top surface of the top plate 70 that fluidly communicates with the flow channel 402.

An advantage of the thermally conductive base member is that thermally conductive base member utilizes a first metal base member having female coupling portions thereon that are utilized to couple the second and third metal base members thereto to increase a size of the thermally conductive base member for holding a plurality of battery packs thereon.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A thermally conductive base member, comprising:
a first metal base member having a first bottom plate, first and second female coupling portions defining first and second grooves, respectively, therein, and first and second rib portions; the first and second female coupling portions being coupled to first and second ends, respectively, of the first bottom plate; the first and second rib portions of the first metal base member extending from a top surface of the first bottom plate and being spaced apart from one another and being disposed between the first and second female coupling portions;
a second metal base member having a second bottom plate, a first male coupling portion, and first and second rib portions; the first male coupling portion being coupled to the second bottom plate proximate to a first end of the second bottom plate; the first and second rib portions of the second metal base member extending from a top surface of the second bottom plate and being spaced apart from one another; the first male coupling portion of the second metal base member being disposed in and coupled to the first groove of the first female coupling portion of the first metal base member;
a top plate being coupled to a top surface of the first female coupling portion, a top surface of the second female coupling portion, and the first and second rib portions of the first metal base member such that a first flow channel is defined between the first and second rib portions of the first metal base member and the top plate; a first weld joint extending through the top plate, the first female coupling portion of the first metal base member, and the first male coupling portion of the second metal base member;
the top plate being coupled to the first and second rib portions of the second metal base member such that a second flow channel is defined between the first and second rib portions of the second metal base member and the top plate;
a first inlet port member having a first tube being coupled to a top surface of the top plate that fluidly communicates with the first and second flow channels; and
a first outlet port member having a second tube being coupled to the top surface of the top plate that fluidly communicates with the first and second flow channels.

2. The thermally conductive base member of claim 1, further comprising:
a third metal base member having a third bottom plate, a second male coupling portion, and first and second rib portions; the second male coupling portion being coupled to the third bottom plate proximate to a first end of the third bottom plate; the first and second rib portions of the third bottom plate extending from a top surface of the third bottom plate and being spaced apart from one another; the second male coupling portion of the third metal base member being disposed in and coupled to the second groove of the second female coupling portion of the first metal base member; and
the top plate being coupled to the first and second rib portions of the third metal base member such that a third flow channel is defined between the first and second rib portions of the third metal base member and the top plate.

3. The thermally conductive base member of claim 2, further comprising:
a second inlet port member being coupled to the top surface of the top plate that fluidly communicates with the third flow channel; and
a second outlet port member being coupled to the top surface of the top plate that fluidly communicates with the third flow channel.

4. The thermally conductive base member of claim 1, wherein the first and second rib portions of the first metal base member extend longitudinally along the first bottom plate and substantially parallel to one another.

5. The thermally conductive base member of claim 1, wherein the first female coupling portion of the first metal base member comprises a substantially C-shaped portion defining the first groove therein.

6. The thermally conductive base member of claim 5, wherein the first male coupling portion of the second metal base member includes an extension portion coupled to the top surface of the second bottom plate proximate to the first end of the second bottom plate, the extension portion extending parallel to the second bottom plate and past the first end of the second bottom plate.

7. The thermally conductive base member of claim 1, wherein the first and second metal base members, and the top plate are constructed of aluminum.

8. The thermally conductive base member of claim 1, further comprising a thermally conductive pad disposed and coupled to the top surface of the top plate.

9. A thermally conductive base member, comprising:
a first metal base member having a first bottom plate, first and second C-shaped female coupling portions defining first and second grooves, respectively, therein, and first and second rib portions; the first and second C-shaped female coupling portions being coupled to first and second ends, respectively, of the first bottom plate; the first and second rib portions of the first metal base member extending from a top surface of the first bottom plate and being spaced apart from one another and being disposed between the first and second C-shaped female coupling portions;
a second metal base member having a second bottom plate, a first male coupling portion, and first and second rib portions; the first male coupling portion being coupled to the second bottom plate proximate to a first end of the second bottom plate; the first and second rib portions of the second metal base member extending from a top surface of the second bottom plate and being spaced apart from one another; the first male coupling portion of the second metal base member being disposed in and coupled to the first groove of the first C-shaped female coupling portion of the first metal base member;

a third metal base member having a third bottom plate, a second male coupling portion, and first and second rib portions; the second male coupling portion being coupled to the third bottom plate proximate to a first end of the third bottom plate; the first and second rib portions of the third bottom plate extending from a top surface of the third bottom plate and being spaced apart from one another; the second male coupling portion of the third metal base member being disposed in and coupled to the second groove of the second C-shaped female coupling portion of the first metal base member;

a top plate coupled to a top surface of the first C-shaped female coupling portion, a top surface of the second C-shaped female coupling portion, and the first and second rib portions of the first metal base member such that a first flow channel is defined between the first and second rib portions of the first metal base member and the top plate;

the top plate being coupled to the first and second rib portions of the second metal base member such that a second flow channel is defined between the first and second rib portions of the second metal base member and the top plate;

the top plate being coupled to the first and second rib portions of the third metal base member such that a third flow channel is defined between the first and second rib portions of the third metal base member and the top plate;

a first inlet port member that fluidly communicates with the first and second flow channels; and a first outlet port member that fluidly communicates with the first and second flow channels, wherein a first weld joint extends through the top plate, the first C-shaped female coupling portion of the first metal base member, and the first male coupling portion of the second metal base member.

\* \* \* \* \*